US008952556B2

(12) United States Patent
Warren (10) Patent No.: US 8,952,556 B2
(45) Date of Patent: Feb. 10, 2015

(54) MODULAR TEMPERATURE MAINTAINING OR REGULATING STORAGE SYSTEMS (76) Inventor: John S. Warren, Ingleside, IL (US)

(*) Notice: Subject to any disclaimer, the term of this patent is extended or adjusted under 35 U.S.C. 154(b) by 198 days.

(21) Appl. No.: 13/432,983

(22) Filed: Mar. 28, 2012

(65) Prior Publication Data

US 2012/0247724 A1 Oct. 4, 2012

Related U.S. Application Data (60) Provisional application No. 61/469,423, filed on Mar. 30, 2011.

(51) Int. Cl.
*H02P 9/04* (2006.01)
*H02K 7/18* (2006.01)
*H02K 49/10* (2006.01)

(52) U.S. Cl.
CPC . *H02K 7/18* (2013.01); *H02K 49/10* (2013.01)
USPC .............................................. 290/1 R; 290/2

(58) Field of Classification Search
CPC ........... F25D 17/02; F03G 7/00; F28D 15/00; F28D 15/0266; F28F 23/00; F28F 2250/08
USPC .................................................... 290/1 R, 2
See application file for complete search history.

(56) References Cited

U.S. PATENT DOCUMENTS

| | | | | |
|---|---|---|---|---|
| 3,788,091 A * | 1/1974 | Miller | | 62/175 |
| 4,065,055 A * | 12/1977 | De Cosimo | | 237/12.1 |
| 5,921,096 A * | 7/1999 | Warren | | 62/185 |
| 6,220,338 B1 * | 4/2001 | Grandi | | 165/48.1 |
| 6,856,037 B2 * | 2/2005 | Yazawa et al. | | 290/43 |
| 7,081,684 B2 * | 7/2006 | Patel et al. | | 290/1 R |
| 7,081,686 B2 * | 7/2006 | Yang | | 290/1 R |

* cited by examiner

*Primary Examiner* — Tho D Ta
(74) *Attorney, Agent, or Firm* — McDermott Will & Emery LLP (57) ABSTRACT

A modular heating or cooling system includes a heating and/or cooling unit and a plurality of storage modules that may be releasably connected to the heating and/or cooling unit by a releasable coupling. The storage modules may include a heat exchanger having a thermal transfer bladder filled with eutectic fluid. The storage modules may include a hydroelectric generator and/or turbine assembly placed in-line in a circulation line for transporting heated or cooled fluid to and/or from the heat exchanger, the hydroelectric generator and/or turbine assembly operative to drive an electric light or a fan. A base station in the form of a movable cabinet is also disclosed for storing a plurality of the storage modules. The base station includes circulation lines that attach to fluid supply lines from a heating or refrigeration unit and may include terminals with releasable couplings for connecting to the storage modules stored therein.

19 Claims, 9 Drawing Sheets

MODULAR TEMPERATURE MAINTAINING OR REGULATING STORAGE SYSTEMS

CROSS REFERENCE TO RELATED APPLICATIONS

The present application claims the benefit of U.S. Provisional Patent Application No. 61/469,423 filed Mar. 30, 2011, the entire contents of which are incorporated herein by reference.

BACKGROUND OF THE INVENTION

1. Field of the Invention

The present invention relates to storage and/or holding systems for heating and/or cooling products contained therein, such as food products, medical products, laboratory products, chemicals, and the likes, and more particularly to systems for storing such products at a particular temperature warmer or cooler than the surrounding ambient temperature.

2. Description of the Background of the Invention

Warren U.S. Pat. No. 5,921,096 discloses a modular food container system for heating or refrigerating foods for use in restaurant buffet bars and the like. The food container system includes a plurality of food storage receptacles for receiving food and a plurality of receptacle temperature maintaining storage modules. Each temperature maintaining storage module is configured to receive a food storage receptacle and to thermally communicate therewith. Each temperature maintaining storage module is fluidly connected to adjacent temperature maintaining storage modules, and a refrigeration or heating device is operatively coupled thereto to provide thermal exchange fluid to each temperature maintaining storage module. Each temperature maintaining storage module includes a heat exchange device, such as a heat exchange tube with heat sink fins, disposed between an insulating outside wall and a thermally conductive inside wall. In another embodiment, thermal exchange fluid is pumped directly into a hollow space between the inside wall and the outside wall and directly contacts the inside wall, and baffles are attached to the inside wall. A thermostat regulates the temperature of each temperature maintaining storage module independent of the temperature of adjacent temperature maintaining storage modules.

SUMMARY OF THE INVENTION

According to one aspect of the invention, a modular temperature control system includes a temperature control unit, a storage module that includes a product storage area, and a thermal transfer bladder disposed in the storage module. The thermal transfer bladder is filled with eutectic fluid. The module temperature control system also includes a fluid transport line having a first end and a second end, wherein the first end is coupled to the temperature control unit and the second end is coupled to the storage module by a releasable coupling. Heated or chilled fluid from the temperature control unit is transported through the storage module to heat or chill, respectively, the eutectic fluid thereby warming or cooling, respectively, the product storage area relative to the environment where the storage module is disposed.

According to another aspect of the invention, movable storage module for storing a product at a selected temperature includes an insulated outer shell and a heat exchanger. The heat exchanger includes a thermal exchange bladder for heating or cooling an inner side of the outer shell. The movable storage module also includes circulation lines for circulating heated or cooled liquid to and from the heat exchanger and releasable couplings at terminal ends of the circulation lines on the exterior side of the outer shell. The releasable couplings may be coupled and uncoupled to complementary couplings without leaking fluid from the circulation lines.

According to a further aspect of the invention, a cooling fan includes a base defining a product storage area, a heat exchanger, and a fan unit carried above the base. The cooling fan also includes circulation lines for circulating heated or cooled liquid to and from the heat exchanger and the fan unit and releasable couplings at terminal ends of the circulation lines on the exterior side of the outer shell. The releasable couplings are operative to be coupled and uncoupled to complementary couplings without leaking fluid from the circulation lines. The fan unit also includes a hydroelectric generator or turbine assembly connected in-line in one of the circulation lines for operating the fan unit, wherein circulation of fluid through the circulation lines cools the heat exchanger and drives the fan unit to circulate air in the product storage area.

DETAILED DESCRIPTION OF THE PREFERRED EMBODIMENTS

Modular systems for storing, transporting, and accessing products at a desired temperature are disclosed. The systems can be adapted for cooling by, for example, using a refrigeration unit such as a fluid recirculator (for example, a glycol recirculator or chiller) with appropriate pumps and electrical controls as would be well understood in the art to circulate and exchange chilled thermal transport fluid through fluid transport lines to individual storage modules. In some embodiments the thermal transport fluid is glycol. However, it should be apparent that other fluids (both liquids and gasses) may be used as thermal transport fluids). Examples of thermal transport fluids include water, a saline solution, alcohols, compressed Nitrogen or other gas, or a pressurized gas. The systems can alternatively or additionally be adapted for heating by, for example, using a heating unit such as a glycol heating recirculator with appropriate pumps and electrical controls as would be well understood in the art to circulate and exchange heated thermal transport fluid such as glycol through fluid transport lines to individual storage modules. The invention is not limited to the use of glycol, and other types of thermal transport fluids, such as water, oil, steam (for heating), or any other fluid suitable for being circulated though the heat exchange systems described herein may be used.

Each storage module includes a product storage area and heat exchanger with circulation lines that releasably connect to the fluid transport lines. The circulation lines may be pliable, flexible, hard plumbed, and/or rigid. The product storage area is outside of the heat exchanger and may be physically separated from the heat exchanger or simply defined by an outside wall of the heat exchanger. The product storage area may have the form of a recessed surface, such as a receptacle for a tray or bowl or directly for product, a flat surface, or other form suitable for storing a particular product.

The circulation lines are preferably connected to the fluid transport lines by any well-known quick-connect coupling or other releasable couplings used in fluid lines, such as hydraulic fluid lines, that prevents loss of fluid from either the fluid transport lines or the heat exchanger. One exemplary type of releasable coupling that may be used is a ball plunger and ball locking sleeve, but any well known type of fluid line releasable coupling may be used. The circulation lines may be metal tubing, food grade hoses, or other type of ducting, tubing, or piping that one of skill in the art would understand to be suitable are for transporting the thermal transport fluid through the storage module and to or through the heat exchanger.

The fluid transport lines extending from the refrigeration unit or heating unit to the storage module or storage modules are preferably, although not necessarily, flexible to provide for easy movement of various portions of the system relative to each other. Any tubing sufficient to carry the heated or cooled thermal transport fluid to and from the heating or cooling unit to the individual storage module or storage modules may be used. Without limitation, some suitable types of tubing include metal, plastic, rubber, and PVC.

The modular system preferably includes a heating and/or cooling unit that releasably connects to a plurality of individual storage modules using the releasable couplings as previously described. The heating and/or cooling unit heats or cools a storage module to a selected temperature when connected thereto, and each storage module can be easily disconnected from the heating and/or cooling unit and transported to a location remote therefrom. The storage module is adapted as described herein to maintain the selected temperature for an extended period of time after being disconnected from the heating and/or cooling unit.

The plurality of storage modules may be connected to the heating and/or cooling unit simultaneously, preferably in a series loop or a parallel loop. In a series loop, thermal transport fluid travels from the heating and/or cooling unit successively to each connected storage module and returns to the heating and/or cooling unit after going through each storage module. In a parallel loop, the inlet of each storage module is in fluid connection with a single fluid transport line with flow of thermal transport fluid coming from the heating and/or cooling unit, and the outlet of each storage module is in fluid connection with a single fluid transport line with flow of thermal transport fluid returning to the heating and/or cooling unit. In some embodiments, the plurality of storage modules may be connect to the heating and/or cooling unit in a combination of parallel and series loops. For example, one line from the heating and/or cooling unit may break off into a plurality of arteries. Each such artery may transport fluid from the heating and/or cooling unit to a group of storage modules connected in series and/or parallel. Lines from the groups of storage modules return to the heating and/or cooling unit to complete a loop.

In another aspect, the plurality of storage modules may be alternatingly connected to the heating and/or cooling unit at successive times, whereby one or more storage modules are heated or cooled at one time, disconnected, and one or more new storage modules are subsequently connected to the heating and/or cooling unit and heated or cooled. Thereby, one or more storage modules may be heated or cooled while other storage modules are being transported apart from the heating and/or cooling unit.

In one aspect, the heat exchanger in one or more storage modules is in the form of a thermal exchange bladder. The thermal exchange bladder includes an enclosed, and preferably sealed, volume defined between, for example an inner wall and an outer wall, wherein the volume is preferably filled with a bladder fluid. A preferred bladder fluid is a eutectic fluid, such as a mixture of sodium chloride and water or any other eutectic fluid including water, oil, gels, or more viscous materials, such as thermal mastic paste or clay may be used. Further, one or more heat exchange tubes for transporting the thermal transport fluid also run through the volume and the fluid or are otherwise thermally connected to the bladder fluid, such as by extending adjacent to, covering, or contacting a thermally conductive outer wall of the thermal exchange bladder. The heat exchange tubes are connected by any sufficient arrangement well known or readily ascertainable to one skilled in the art to at least one inlet and at least one outlet that connect to inlet and outlet portions of the fluid transport lines in communication with the heating or cooling unit via the releasable couplings as described above. Further, the interior of the heat exchange tubes is preferably in fluid isolation from the volume inside the thermal exchange bladder in order to prevent physical mixing of the bladder fluid with the thermal transport fluid inside the heat exchange tubes. The heat exchange tubes are preferably made of a highly thermally conductive material, such as copper or other metal, and may include heat fins or other features to control the exchange of heat between the bladder fluid inside the thermal exchange bladder and the thermal transport fluid inside the heat exchange tubes.

The thermal exchange bladder preferably is either thermally connected to a thermally conductive support surface for the product, or one of the sides of the thermal exchange bladder directly defines the support surface. In some preferred arrangements, the thermal exchange bladder has a thermally conductive wall and a thermally insulative wall. The thermally conductive wall defines an interior recess or surface for accepting the product itself or a thermally conductive tray for the product, such as a metal tray, and the thermally insulative wall defines an exterior wall that is adapted for being touched and/or handled, such as a outer wall of a storage module. In another arrangement, the thermal exchange bladder is made of metal on all walls, and one or more wall surfaces are adapted as a support surface for the product or a tray for the product to directly engage, and a layer of thermal insulation covers and/or surrounds the remaining portions of the walls to retard or prevent the transfer of thermal energy in those directions.

The thermal exchange bladder helps to evenly distribute temperature across the thermally conductive support surface and thereby reduces the formation of hot or cold spots that may have a local temperature that is higher or lower than the overall temperature desired. Further, with the use of a eutectic fluid in the thermal exchange bladder, a storage module may be cooled or heated to a selected temperature and then disconnected from the fluid transport lines and transported to a remote location separate from the refrigeration or heating unit that was used to reach the selected temperature. The eutectic fluid, however, will retain the heat (or cold) and maintain the selected temperature for a longer period of time than without such a thermal exchange bladder. Thus, for example a bowl-shaped storage module that has been cooled to a selected temperature by a refrigeration unit may be filled with a refrigerated food, such as fruit, placed on a room service cart, and wheeled to a guest room in a hotel for a customer's consumption, while maintaining the selected temperature for a significantly longer period of time than if no thermal exchange bladder were used. In another example, a tray that has been heated by a heating unit may be uncoupled, filled with hot sliced ham, carried to a buffet table, and placed on the buffet for guests to fill their plates from without having to have a separate heating unit, such as a candle or electric heater, attached to or carried by the buffet table. Thus, the thermal exchange bladder, especially when filled with a eutectic fluid, can be thought of as a "thermal capacitor" that allows a portable storage module to be maintained at a desired temperature without being connected to a refrigeration or heating unit for a longer period of time. Further, use of appropriate releasable couplings to connect the inlet and outlet of the heat exchange tubes in the storage module to the fluid transport lines attached to the refrigeration or heating unit allows the storage module to be easily, safely, and cleanly separated from the refrigeration or heating unit and transported as desired.

In some aspects, a storage module can include a turbine, spindle, fan, paddle, wheel, impeller, propeller, or other device in a circulation line (i.e., "in-line") which will hereafter be referred to as a turbine without being limited to any specific design thereof other than that the turbine spins or rotates in place in response to movement of the thermal transport fluid through the circulation line. The turbine may be connected to a miniature electrical generator for producing electrical current for powering electrical devices, such as light emitting diodes (LEDs), fan, or other electrical devices in the product storage area of the storage module. The electric generator may be used to charge a battery (not shown) so that the power may be provided to such electrical devices when the fluid lines are disconnected and fluid is not flowing through the circulation line. In another aspect, the turbine may include a spindle that rotates a magnet, which in turn is used to rotate an implement in the product storage area such as a fan that is magnetically coupled to the magnet but is physically separated from the circulation line within the product storage area, which may maintain a more sanitary condition in the product storage area. In this way, each storage module has its on energy generation unit that makes the storage module easier to integrate into a larger storage module system in which more than one storage module is charged by a given heating and/or refrigeration unit either simultaneously or successively by eliminating the need for a connection for a power line that is separate from the connection for the thermal transport fluid.

Figure 1:
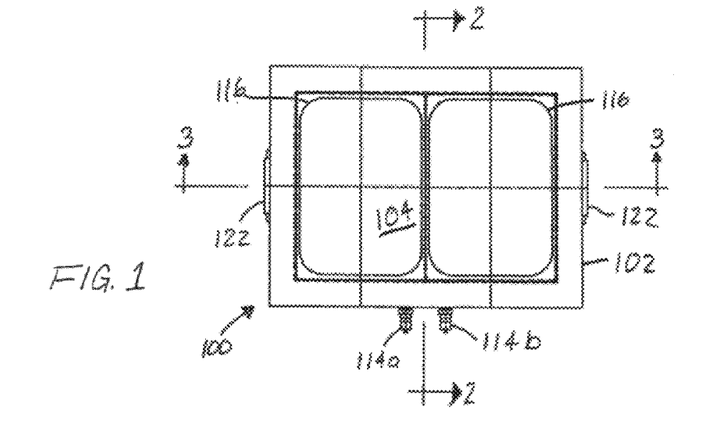
FIG. 1 is a plan view of a storage module for heating or cooling contents stored therein.
Figures 2, 3:
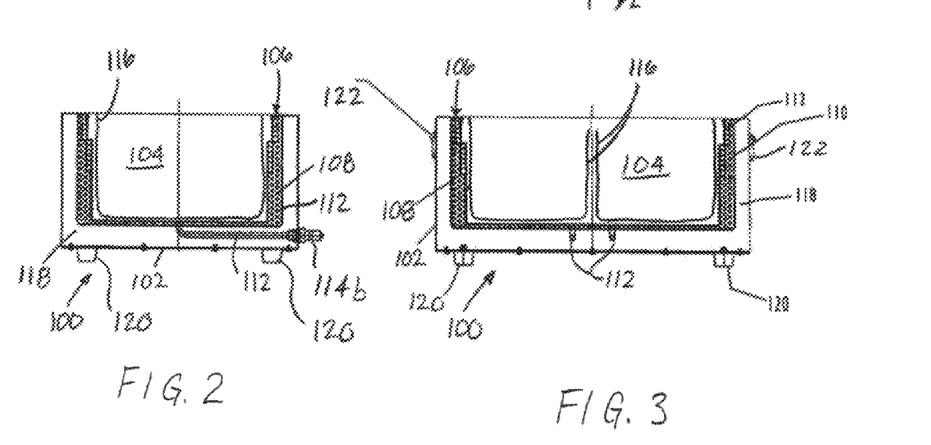
FIGS. 2 and 3 are sectional views taken generally along the lines 2-2 and 3-3, respectively, of FIG. 1.

Turning now to the drawings. FIGS. 1-3 show a storage module 100 for use with modular system. The storage module 100 includes an outer shell 102 in the shape of a generally rectangular vessel defining a storage cavity 104 that is open upwardly, a heat exchanger 106 having a thermal exchange bladder 108 filled with eutectic fluid 110 and having circulation lines 112 extending there through as previously described disposed in the cavity, and releasable couplings 114a, 114b for operatively connecting inlet and outlet circulation lines to the fluid transport lines from a heating and/or cooling unit (not shown) to the heat exchanger in the storage module. As best seen in FIGS. 2 and 3, the thermal exchange bladder 108 has a pan shape portion that fits within the storage cavity 104 of the outer shell 102 and lines the bottom and four sidewalls of the cavity 104. Product may be stored directly on the thermal exchange bladder, or removable storage vessels 116, such as metal pans, may further be disposed in the pan shaped portion of the heat exchanger. It should be apparent that the product may be pre-heated or pre-cooled prior to being stored in the thermal exchange bladder or the removable storage vessels 116. The outer shell 102 has a lining of thermal insulation 118 to prevent or at least retard movement of heat from the outer pan wall of the heat exchanger 106 on the interior side of the outer shell 102 to the exterior side of the outer shell 102. Feet 120 are disposed on the bottom wall of the outer shell 102, and handles 122 are disposed on the exterior of the outer shell to facilitate easy moving of the storage module 100.

In use, the storage module 100 is connected to the fluid transport lines from the heating and/or cooling unit with the releasable couplings 114a, 114b. Heated or cooled thermal transport fluid is then pumped through the circulation lines 112 in the heat exchanger 106, thereby either heating or cooling the eutectic fluid 110 encased within the thermal exchange bladder 108. Product (not shown) disposed in the pan of the thermal exchange bladder 108, whether directly or in the removable storage vessels 116, is cooled or heated to a selected temperature while the thermal transport fluid is being pumped through the heat exchanger 106. When a selected temperature is reached, the fluid transport lines are disconnected from the releasable couplings 114a, 114b, and the storage module 100 may then be moved to another location, such as a buffet bar in a restaurant, or on a food service delivery cart in a hotel or airplane, or to an operating room or staging room in a hospital, to await use of the product stored therein. The eutectic fluid 110 in the thermal exchange bladder 108 will then maintain the selected temperature for a longer period of time than a storage module that does not have a thermal exchange module.

In some specific examples, the storage module 100 may be adapted to maintain cold and/or hot temperature maintaining modules or vessels with the addition of the thermal exchange bladder. In some instances, the storage module is designed to maintain a selected temperature of foods, liquids, or non-food products. A glycol recirculator for example, may be used to circulate chilled glycol and exchange cold therms through flexible cooling lines to one or more releasably coupled storage modules, and the glycol is circulated throughout a eutectic fluid bladder within the one or more storage modules. A heating unit may include, for example, a recirculator that heats and pumps a fluid such as glycol or water to circulate and exchange heat therms through flexible cooling lines to one or more releasably coupled storage module or modules. The glycol is circulated throughout the eutectic fluid bladder within the storage module or modules. The eutectic fluid bladder helps evenly displace the thermal exchange within the modules. Because of the addition of the eutectic fluid bladder, the modules, which may be cooled or heated to a set temperature, may now be disconnected and carried to a remote location, separate from the cooling or heating machine used to reach the desired temperature. In one example, a bowl module that is cooled by the refrigeration unit may be filled with fruit, placed on a room service cart, and wheeled to a guest room in a hotel for a customer's consumption. In another example, a tray that is heated by the heating unit may be uncoupled, filled with hot sliced ham, carried to a brunch buffet and place on the buffet for guests to fill their plates from. The glycol and eutectic fluid interact by thermal exchange through conductive materials in the heat exchanger, such as the circulation lines themselves, heat fins or baffles, or other known heat exchange structures. The medium in the thermal exchange bladder used to spread the heat therms evenly is not limited to a eutectic fluid only; it may be an oil, water, or a more viscous material layer, such as thermal mastic paste or clay. The materials of the storage modules may be plastic or metal or other suitable materials. The cooling or heating lines may be soft flexible copper or beverage tubing made of food grade plastic.

In some embodiments, a storage module may be disconnected from the heating and/or cooling unit and taken to a remote location. At the remote location, the storage module may be reconnected to the heating and/or cooling unit from which it had been disconnected or connected to another heating and/or cooling unit. For example, the heating and/or cooling unit and the storage modules may be transported in a cabinet and held in such cabinet until needed. While the storage modules are held in the cabinet, such storage modules may be connected to the heating and/or chilling unit. When needed, the storage modules may be disconnected from the heating and/or chilling unit, removed from the cabinet, and placed at a remote location (such as an area where the product in the storage modules is to be displayed or consumed). Once at the remote location, the storage module may be reconnected to the heating and/or cooling unit in the cabinet or to another heating and/or cooling unit.

As used herein, the term "eutectic" includes all relevant meanings related to a mixture of different materials that has the lowest freezing point of all combinations or constituents of the mixture, or the temperature at which this occurs, as would be understood by a person of skill in the art.

The storage module 100 is not limited to the specific shape and rectangular vessel form factor shown here. Rather, the storage module may have many different shapes and form factors, such as that of a bowl, a plate, a tray, a pitcher, and other similar form factors.

Figure 4:
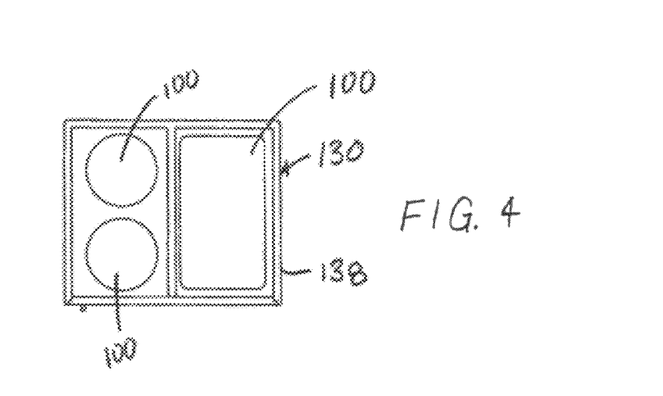
FIGS. 4 and 5 are plan and front elevational views of a storage module base station.
Figure 5:
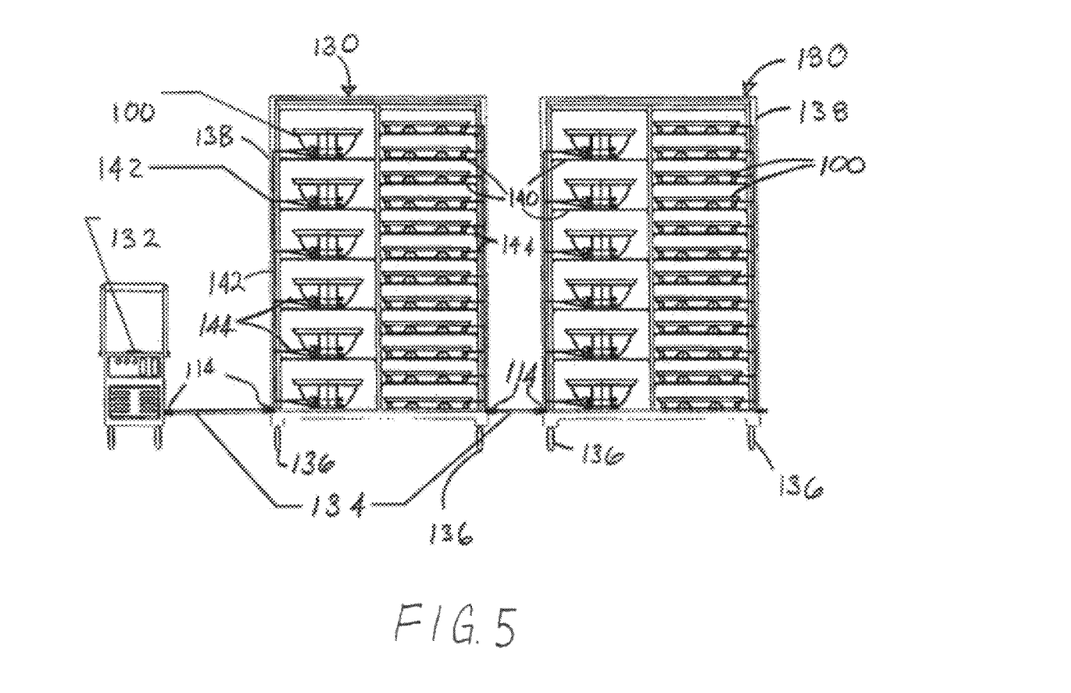

Turning now to FIGS. 4 and 5, storage module base stations 130 are shown operatively connected to a heating unit, or thermal recycler 132. Each base station 130 preferably includes one or more thermal exchange bladders filled with eutectic fluid (hereinafter, also called a "eutectic bladder"). The base stations 130 may be adapted as cold and/or hot temperature maintaining modules or vessels with the addition of one or more thermal exchange bladders 108 that releasably couple with the a bank of one or more hot or cold storage modules. An appropriate heating or refrigeration unit, such as a glycol recirculator for cold or the thermal recirculator 132 for hot, for example, circulates and exchanges heat or cold therms through flexible fluid transport lines, which are coupled to a module bank with appropriate releasable couplings. As the glycol is circulated throughout the module bank feed lines, it also circulates through the tubing within each module or modules connected to the storage module base station 130. These storage modules may also contain one or more of the hydro electric or magnet vector custom designs, as described in more detail below. The base station 130, which thermally cools or heats the storage modules 100, may hold several storage modules 100 and several different styles of storage modules with different form factors, such as bowls, trays, and/or vessels. The base station 130, which thermally cools or heats the individual storage modules 100 may be configured in a way that the storage modules are connected individually to be cooled or heated or in a way that the cart itself is cooled or heated and the modules are placed in the cart to be cooled or heated without having to attach the couplers 114a, 114b. The base station 130 may also be designed as a flat table that the storage modules 100 connect on top of and may be wheeled into a room.

Thus, as best seen in FIG. 5 for example, first and second base stations 130 are connected in series to the thermal recycler 132 with fluid transport lines 134 and appropriate releasable couplings 114. Of course, the thermal recycler 132 is used for heating, and alternatively a refrigeration unit could be used for cooling. Each base station 130 is in the form factor of an upstanding cart on casters or wheels 136 and having an outer shell 138 with a bottom, top, back, left and right side walls and a door. Each base station 130 also includes a number of shelves 140 upon which storage modules 100 may be placed and carried. Circulation lines 142 run through the walls between the releasable couplings 114 on the exterior of the base station and one or more connection terminals 144 projecting into the interior of the base station. Each connection terminal 144 includes input and output lines with appropriate releasable couplings for operatively connecting to the releasable couplings 114a, 114b on the storage modules 100. Thus, the base station 130 functions as a terminal that may be used to connect to and heat or cool each of a plurality of storage modules 100 directly by direct transmission of thermal transport fluid from the thermal recycler. Further, each base station 130 preferably also includes a heat exchanger with a eutectic bladder in one or more of the walls of the base station, whereby the base station also functions as a movable refrigerator for the storage modules 100 or other product directly in a manner substantially as previously described.

Figure 6:
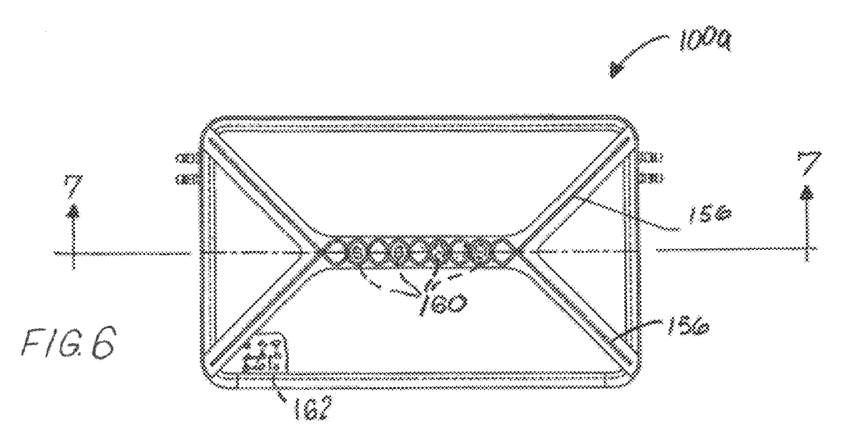
FIG. 6 is a plan view of a storage module with an in-line hydroelectric generator.
Figure 7:
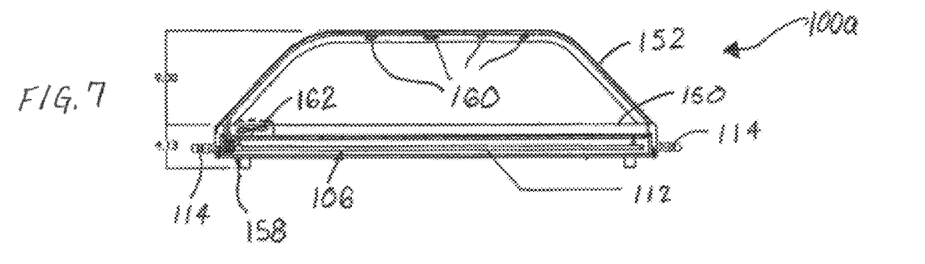
FIG. 7 is a sectional view of the storage module of FIG. 6 taken generally along the line 7-7.
Figure 8:
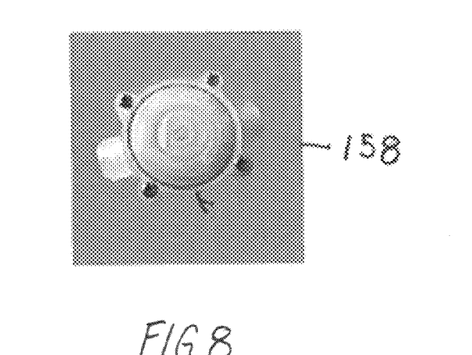
FIG. 8 is a detail view of the storage module of FIG. 6.

Turning now to FIGS. 6-8, a storage module 100a includes a flat tray 150 for carrying product thereon, a dome 152 covering the tray, a heat exchanger 106 with circulation lines 112 operatively connected to releasable couplings 114 for connection to fluid transport lines, such as 134 (not shown), operatively connected to a heating or refrigeration unit, such as 132 (not shown), in generally the same manner as previously described herein. The heat exchanger 106 preferably includes a thermal exchange bladder 108, such as a eutectic bladder, disposed inside the tray 150 and having a thermally conductive surface, such as a metal, disposed at the top surface of the tray 150 within the dome 152. The dome 152 is preferably made of a clear material, such as a clear acrylic, and includes a door 154 hingedly attached thereto for providing access into the dome. Additional heat exchange lines 156 may extend from the circulation lines and/or the heat exchanger tubes 112 along the dome 152 to provide additional cooling to the air inside the dome.

A miniature hydroelectric generator 158 is interposed in-line with one of the circulation lines or heat exchanger tubes 112 in the storage module 100a. The generator 158 is driven by the flow of thermal transport fluid through the circulation lines 112 to spin a paddle or wheel and rotatably drive a post or spindle to create electricity within the storage module 100a. The storage module 100a may be used for maintaining cold and/or hot temperature. A recirculator, for example, may be used to circulate chilled glycol or fluid (for cold) and heated glycol or other fluid (for hot) and exchange heat or cold therms through flexible cooling lines to one or more releasably coupled storage modules 100a. As the glycol or other fluid is circulated throughout the tubing within the storage modules 100a, it will by flow and pressure, turn the wheel and spindle of the generator 158 that is fixed in-line with the fluid path, for example in the middle of copper tubing within the storage module 100a. The spindle will then turn a post that runs through a mass or magnet and copper coils, which will generate an amount of current, which will be determined by the mass of copper wire and force that the spindle is being spun at by the liquid being forced through the circulation lines 112. In one use, the current generated by the generator 158 may power, for example, LED lighting 160 that is mounted throughout the module. In another use, the current generated by the generator may power, for example, a small fan 162 that may be used to stir hot or cold therms to more efficiently cool or heat the foods, liquids, or non food products inside the dome 152.

Turning now to FIGS. 9-13, additional storage modules 100b (FIGS. 9 and 10) and 100c (FIG. 11) are shown, wherein a turbine assembly 170 is interposed in-line in a circulation line 112 in a similar manner as the generator 158 in storage module 100a and spins a first magnet 172 inside the storage module that can be used to spin a second magnet 174 on an exterior side of the storage module, which in turn can drive a small machine, such as a fan or a generator, either directly or by inducting an electric current. The second magnet 174 is physically separated from, but magnetically coupled with the first magnet 172. The storage modules 100b, 100c include an outer shell 102, a heating and/or cooling tray with a thermal exchange bladder 108, circulation lines 112, and releasable couplings 114a, 114b, all of which are generally functionally similar to the same structures described in regard to storage modules 100 and 100a. Both storage modules 100b, 100c have an exterior form factor of a substantially flat tray module, such as a serving tray, but are not limited to that particular exterior form factor. Storage module 100b further includes a dome 152.

Figure 9:
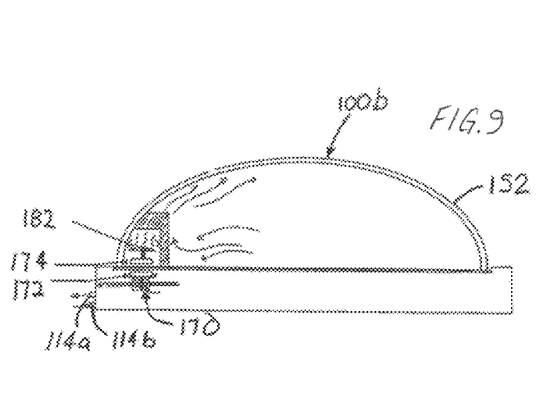
FIGS. 9-13 are cross-sectional, detail, isometric, and partial cut-away isometric views, respectively, of storage modules with an in-line turbine and magnet drive mechanism.
Figure 10:
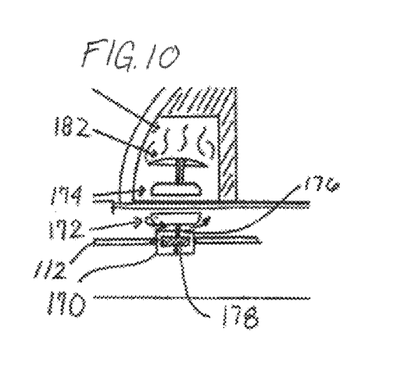
Figure 11:
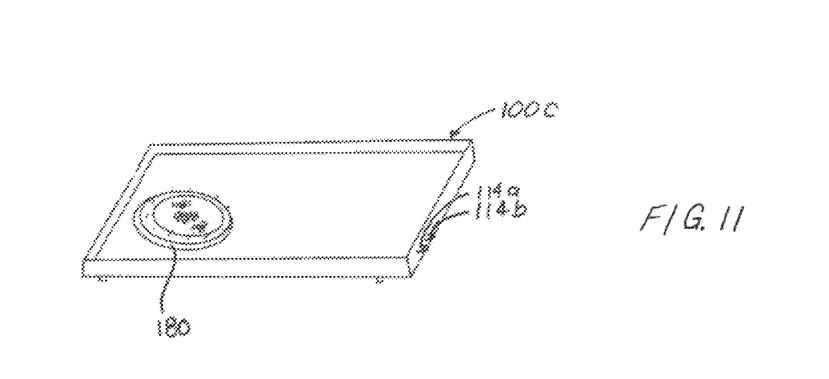

The storage modules 100b and 100c are adapted to maintain cold and/or hot temperature as previously explained with the addition of a thermal exchange bladder (not shown) and include fluid driven magnets 174 that interact in separate physically separated structures. As the glycol is circulated throughout the tubing within the module or modules, it will by flow and pressure, turn a turbine assembly 170 that is fixed in-line with the fluid path, such as in the middle of the copper tubing 112 within the module. The turbine assembly 170 includes a spindle 176 with one end attached to a turbine 178 that is engaged by the glycol and the opposite end attached to the magnet 172. The turbine assembly 170 is preferably encapsulated in the path of the fluid in the circulation line 112. The purpose of the turbine assembly 170 is to spin when the thermal transport fluid is in motion, thereby causing a constant spinning magnetic field from the magnet 172, which will then interface with the magnet 174 that is built into a separate module, such as the dome 152 or a display piece 180, and spaced apart from the magnet 172. When the separate module is placed on top of or in the storage modules 100b, 100c with the turbine assembly 170, the magnet 174 will begin to spin automatically, doing work in that module or dome or display piece.

Figure 12:
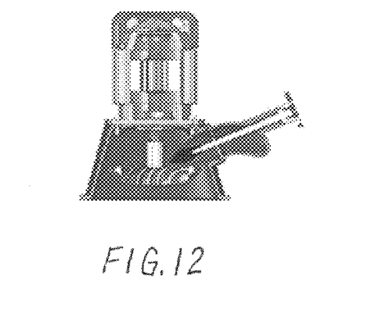
Figure 13:
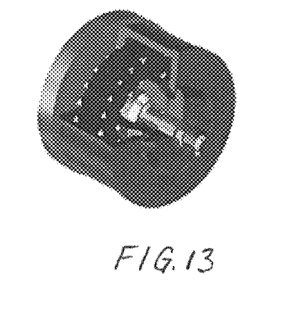

The turbine assembly 170 may be any type of assembly capable of being adapted for the uses described herein. By way of example and without limitation, FIGS. 12 and 13 show enlarged detailed partial cutaway views of two different types of turbine assemblies that may be suitable for use as the turbine assembly 170. Other types of turbine assemblies may be used in a manner that would be understood by a person of skill in the art.

One exemplary implementation is shown in FIGS. 9 and 10, wherein the dome has a built in magnet that is attached to a fan. FIG. 10 is an enlarged partial view of the same features shown in FIG. 9. When the dome is placed on top of the tray module which has the turbine assembly 170 built in, the magnet 174 in the dome will automatically be caught in the magnetic field of the magnet 172 and spin simultaneously therewith, thereby driving a fan 182 and causing air flow in the domed area. Of course, the thermal transport fluid must be moving through the circulation lines 112, such as when the releasable couplings 114a, 114b are operatively connected to the fluid transport lines of a heating or refrigeration unit. As described above, a battery may be charged by a turbine in the fluid transport lines and in such cases, the battery may provide power to a motor that may spin the magnet.

Another exemplary implementation is shown in FIG. 11, wherein a magnet is rotatably carried in the display piece 180. When the display piece 180 is placed on top of the storage module 100c, which has the turbine assembly 170 built therein, the magnet 174 in the display piece 180 will automatically be caught in the magnetic field of the magnet 172 and spin simultaneously therewith and cause light sources such as LED's in the display piece 180 to light up by, for example, induction through a coil of wire or by driving a separate generator. Without being limited by any particular theory, it is believed that, magnets 172 and 174 used in this fashion will create electrical energy that can be used to power one or more small devises placed on top or within the modules or vessels. Using the principle of induction, a spinning magnet will create an alternating current in a coil of wire. This energy is driven by the fluid force by the storage modules 110, 100a, 100b, and 100c that supplies the kinetic energy to spin the magnet 174. The magnets 172, 174 will transfer the kinetic energy and/or create electrical energy that can be transmitted and used to do work, such as lighting the LEDs or moving the fan 182, for example.

Turning now to FIGS. 14-20, storage modules 100d, 100e, and 100f each having a form factor of a stackable transport cabinet, are shown. Each of the storage modules 100d, 100e, and 100f is particularly well suited and adapted for warming product stored therein, although the storage modules 100d and 100f may also be used for cooling product. The storage module 100e includes separate heating and cooling lines and therefore is particularly well suited and adapted for either warming or cooling product stored therein. As with the previously described storage modules, each of the storage modules 100d, 100e, 100f includes an outer shell 102. The outer shell has thermally insulated top, bottom, back, left, and right walls defining an interior cavity, a door for sealing the interior cavity, and feet 120 protruding from the bottom wall. The storage module 100f includes a plurality of horizontal shelves 190, and each of the storage modules 100d, 100e includes a plurality of horizontal ledges 192 extending around the inner periphery of the interior cavity for receiving and supporting appropriately sized trays or pans 194. Further, each storage module 100d, 100e includes one or more heat exchangers 106 with a thermal exchange bladder, preferably filled with eutectic fluid, lining the interior of one or more of the walls of the outer shell and/or disposed in the horizontal shelves 190. A fluid recirculator, for example, may be used to circulate a chilled fluid (for cold) or a heated fluid (for hot) and exchange heat or cold therms through flexible cooling lines to the stackable transport cabinets through the releasable couplings in any manner previously described. The heated or chilled fluid is circulated throughout the circulation lines 112 forming the cabinet plumbing or feed lines to maintain hot or cold temperatures.

The storage modules 100d, 100e, and 100f may also incorporate the miniature hydroelectric generator 158 or turbine assembly 170 designs in a manner consistent with the principles disclosed herein.

Food or non-food items are placed inside the storage modules 100d, 100e, and 100f to be accessed from time to time.

Figure 14:
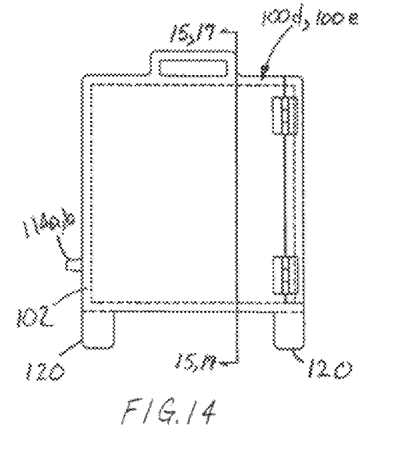
FIG. 14 is a side elevational view of a transport cabinet for storage modules.
Figure 15:
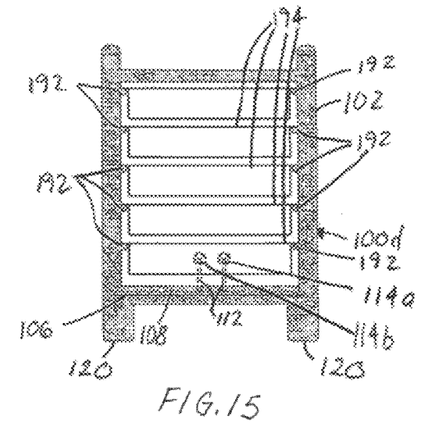
FIG. 15 is sectional view of the transport cabinet of FIG. 14 taken generally taken along the line 15-15.
Figure 16:
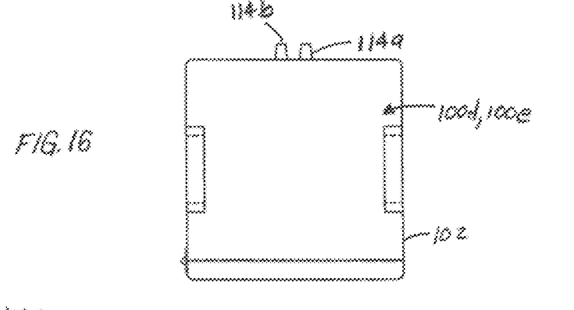
FIG. 16 is a plan view of the transport cabinet of FIG. 14.
Figure 17:
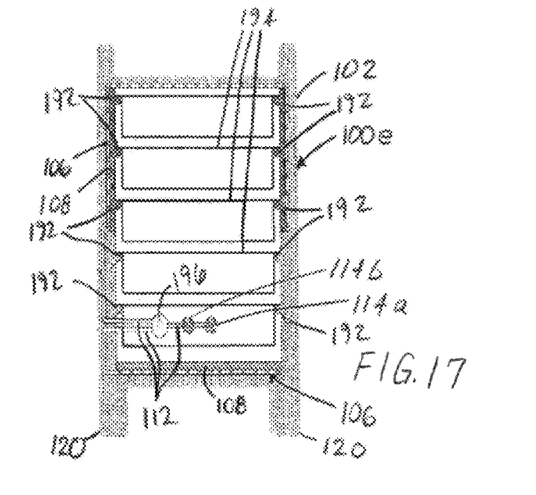
FIG. 17 is a sectional view of the transport cabinet of FIG. 14 taken generally along the line 17-17.
Figure 18:
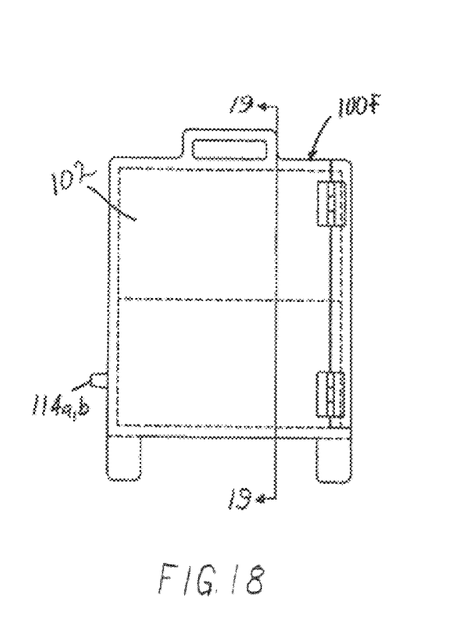
FIG. 18 is side view of another transport cabinet for stackable storage modules.

The storage modules 100d, 100e, and 100f are designed so that two or more may be stacked on each other. When the 100d, 100e, and 100f are stacked on one another, they may be interconnected to allow the hot or cold fluid to cool them in series by, for example, appropriately located releasable couplings, in a manner consistent with the concepts disclosed herein. The cabinets may thus be stacked and wheeled into a room remote from the heating and/or cooling unit.

Figure 19:
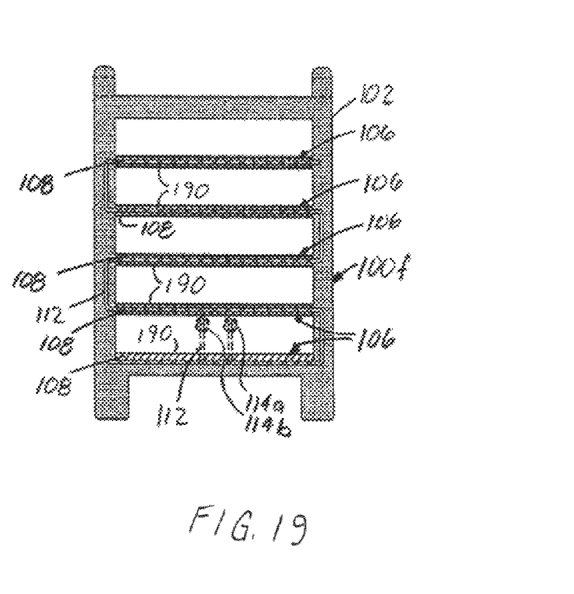
FIG. 19 is a sectional view of the transport cabinet of FIG. 18 taken generally along the line 19-19.
Figure 20:
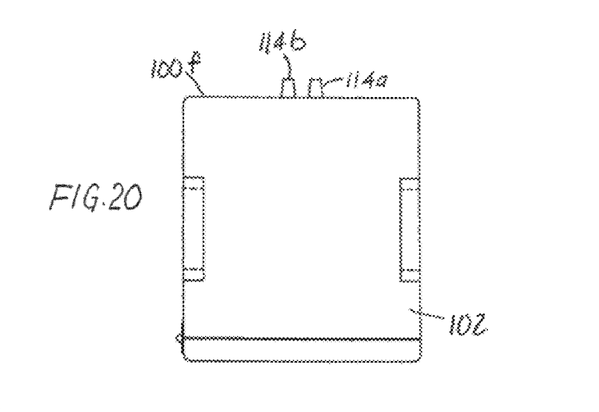
FIG. 20 is a plan view of the transport cabinet of FIG. 18.

In the storage unit 100e, a valve 196 allows the thermal transport fluid to be switched from flowing through a heat exchanger arranged in the bottom wall to flowing through a heat exchanger arranged in an upper portion of the side walls and the top wall. The heat exchanger in the bottom wall is particularly well suited for heating the interior cavity of the storage unit 100e, and the heat exchanger in the side and top walls is particularly well suited for cooling the interior cavity of the storage unit 100e.

Turning now to FIGS. 21-24, a cold display lamp, or cooling lamp 200, is designed to maintain temperature of cold foods, liquids, or non food products, by creating and directing dense cold air to fall naturally over food or non food products to help maintain cold temperatures. A fluid recirculator, for example, may be used to circulate chilled fluid and exchange cold therms through flexible cooling lines to one or more cooling lamp modules. The chilled fluid is circulated throughout the cooling lamp 200 in the same principles already described herein.

The cooling lamp 200 includes a base 202 with two spaced apart arms 204, 206 extending outwardly therefrom and a tower support 208 extending up from the base. The tower extends over the space between the arms 204, 206. Releasable couplings 114a, 114b are disposed on a back side of the base and connected to circulation lines 112 that run up the inside of the tower support 208 to a heat exchanger 106 disposed under a dome-shaped cooling tower 210 at the top of the tower support 208. When connected to refrigeration unit, a fan assembly 212, preferably driven by a turbine assembly 170 in a manner previously described herein, blows air across the heat exchanger 106 and downwardly toward the space between the arms 204, 206. The heat exchanger 106 may be a eutectic bladder as described previously or may be a simple set of exposed chiller coils in a manner well known in the art.

Figure 21:
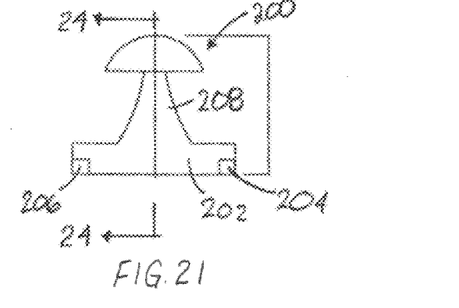
FIGS. 21-23 are front, plan, and rear views of a cooling lamp storage module.
Figure 22:
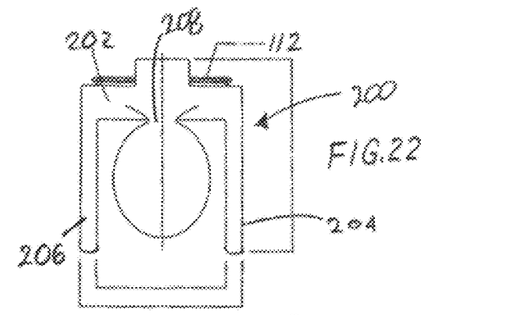
Figure 23:
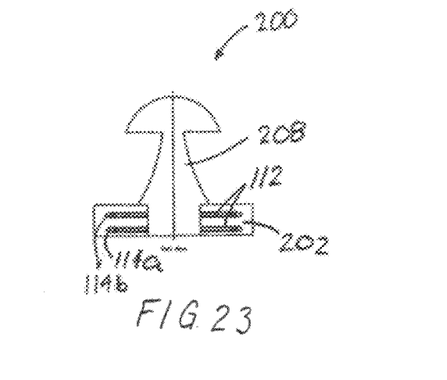
Figure 24:
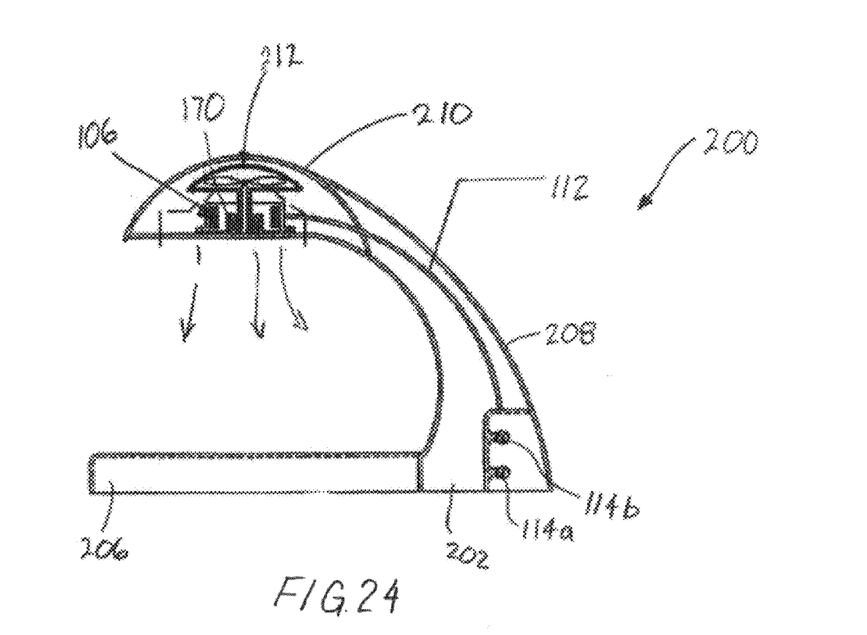
FIG. 24 is a sectional view of the cooling lamp storage module of FIG. 21 taken generally along the line 24-24.

In a first example, a tray of cold appetizers (not shown) is placed on a table between the arms 204, 206, and/or the cooling lamp 200 is positioned over the tray in the same position and hooked to the glycol chiller or fluid recirculator. As the cooling lamp 200 is cooled, cold therms created from more dense cold air, generated in the cooling tower 210 at the top of the cooling lamp 200 fall down onto the tray of appetizers between the arms 204, 206. The process continues as long as the cooling lamp 200 is running.

In a second example, a square or circular tray (not shown) that may be one or four inches or more in depth is placed under the cooling lamp 200 between the arms 204, 206. The tray may be filled with food or non-food items. The cooling lamp 200 is connected to the glycol chiller or fluid recirculator and turned on. The cold therms fall into the tray module and are trapped by sidewalls of the tray, which helps maintain the cold temperatures of its contents.

The cooling lamp 200 may be shaped or designed as a flat or round wall that permits the cold to fall from the top of the module above the food or non-food products. The cold lamp is designed to create airflow by a direct fluid driven fan, to keep food or non-food items within the module cold or hot. The cooling lamps 200 may be single or hooked in series. In one example, cold or hot food or non-food items may be placed in the module. In another example, the cooling lamp 200 may be covered or uncovered or in a closed or open display case or cabinet.

Turning now to FIGS. 25-30, further storage modules 100g (FIGS. 25-17) and 100h (FIGS. 25-30) are generally similar in form to the storage module 100a, in that the storage module 100g has a flat tray 150, a dome 152 covering the flat tray 150, a heat exchanger 106 disposed in the tray 150 for cooling a top surface of the tray, and releasable couplings 114a, 114b. The storage module 100g can be releasably connected to a refrigeration unit, such as a glycol chiller, for example, which is used to circulate and exchange cold or hot therms through flexible cooling lines to one or more releasably coupled storage modules. The glycol is circulated through circulation lines 112 forming the plumbing in the storage modules 100g, 100h to a mass of coils or a honeycomb-type copper or stainless or ceramic heat exchanger 106 at which point a fan driven by the fluid within the module, will draw air over the exchanger to create air flow in the storage module.

The storage modules 100g, 100h may be designed as a bowl, tray, display case or open or closed cabinet.

Figure 25:
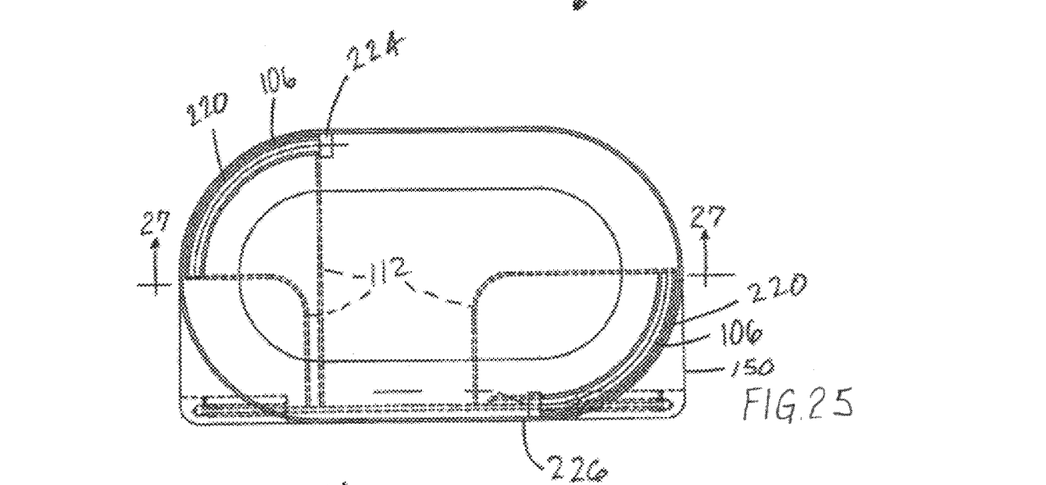
FIGS. 25 and 26 are plan and rear view of another storage module.
Figure 26:
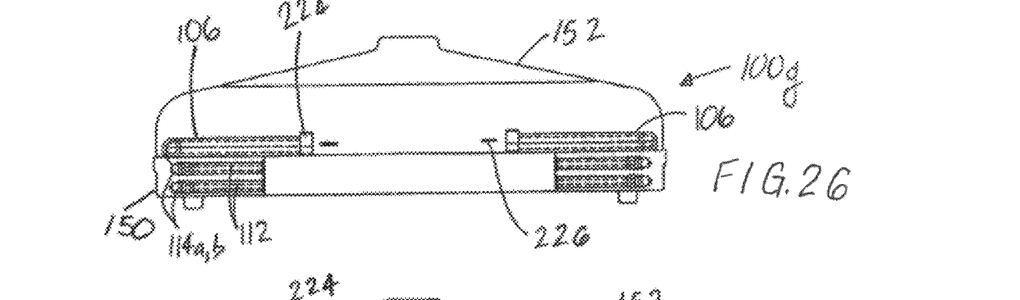
Figure 27:
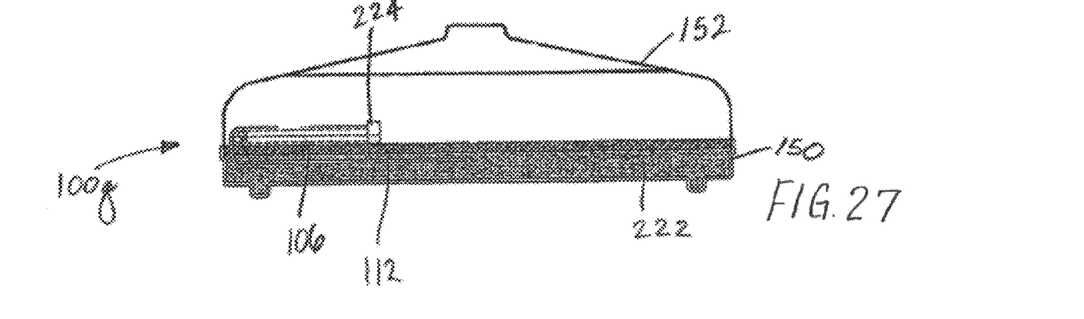
FIG. 27 is a sectional view of the storage module of FIG. 25 taken generally along the line 27-27.

In the exemplary storage module 100g, the heat exchangers 106 are in the form of curved tubular members 220, one on each of two opposite sides of the tray 150. The tubular members 220 are arranged to direct air in a circular path around the inside of the dome 152. The bottom of the tray 150 is filled with thermal insulation 222, and circulation lines 112 preferably run through the thermal insulation 222 to the curved tubular members 220 on the top surface of the tray 150. A fan assembly 224 is connected to each curved tubular member 220 to blow or draw air through the heat exchanger 106 in the circular path. The fan assembly 224 may be driven by a miniature hydroelectric generator 158 or a turbine assembly 170, in the manner described previously herein, or in any other convenient manner. The dome 152 may be connected to the tray 150 with a hinge 226 so that the dome may be opened to expose the top surface of the tray 150.

Figure 28:
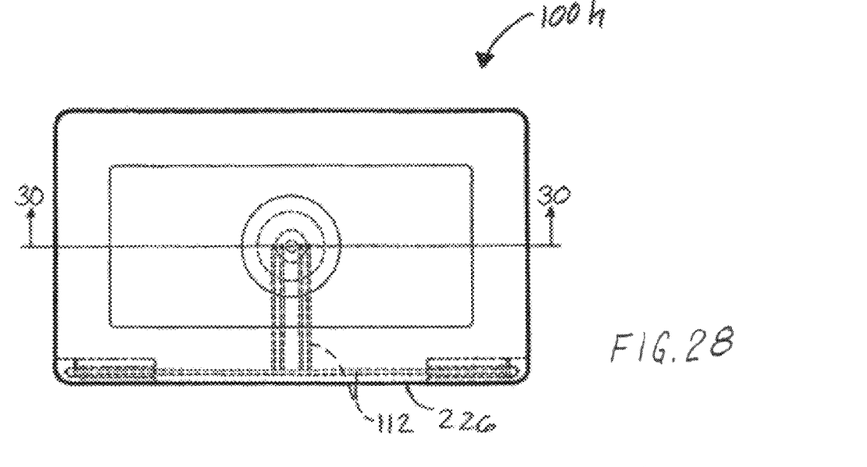
FIGS. 28 and 29 are plan and side views of another storage module.
Figure 29:
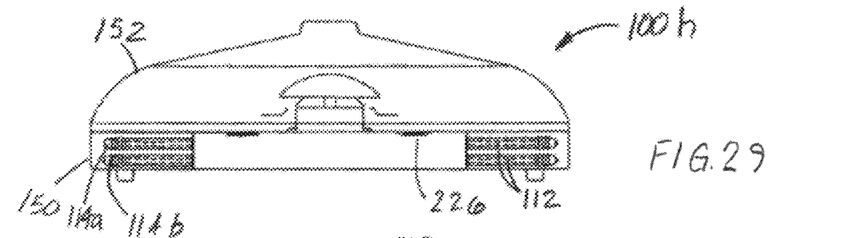
Figure 30:
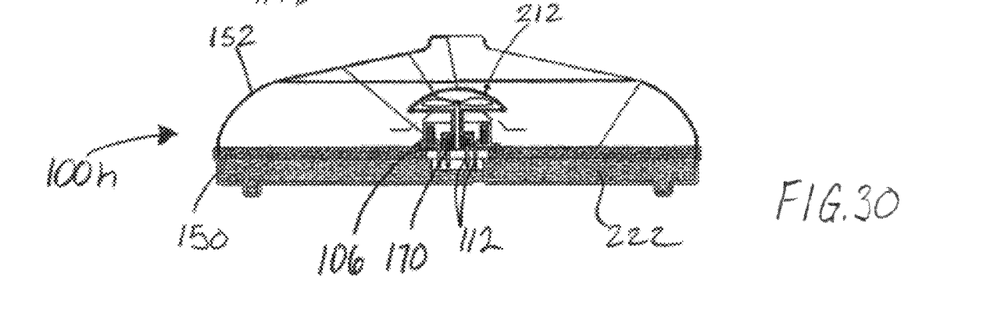
FIG. 30 is a sectional view of the storage module generally taken along the line 30-30.

The exemplary storage module 100h includes a fan assembly 212 powered by a turbine assembly 170 that blows air over a heat exchanger 106, in a substantially similar manner as the same items in the cooling lamp 200. The fan assembly 212 is preferably disposed centrally in the top surface of the tray 150 and projecting upwardly therefrom. Chilled thermal transport fluid is carried to the heat exchanger 106 by circulation lines 112, which also turns the turbine assembly 170 and the fan assembly 212, thereby causing the fan to blow air downwardly past the heat exchanger 106 and onto the tray 150. The bottom of the tray 150 is filled with thermal insulation 22, and circulation lines 112 preferably run through the thermal insulation to the heat exchanger 106 on the top surface of the tray. The dome 152 is preferably connected to the tray 150 with a hinge so that the dome may be opened to expose the top surface of the tray 150.

Industrial Applicability

The heating and/or cooling storage systems of the present invention may be used to store any of many types of products at a selected temperature. It should that storing of product may for brief or for a long period of time and that the produce may dispensed whiled being stored. Further, it should be apparent that the heating and/or cooling systems of the present invention may be used to heat a product from a cold state to a heated state or to cool a product from a heated state to a cool state. Some contemplated uses include storage of food in portable storage modules, for example in a restaurant salad bar, on an airplane, or in a hotel room service cart. Other contemplated uses would include storage of medicines or medical equipment in portable storage modules to help maintain the products at a necessary temperature while still being able to easily move the storage modules without also needing a power source, such as in a medical evacuation helicopter or ambulance or in a movable cart within a hospital. Other uses not specifically enumerated herein are also contemplated.

The word therms s used herein to refer generally to hot or cold energy, such as would be carried and/or transported by fluid or air or other materials.

All dimensions provided in the drawings are in inches.

All patents, patent applications, and other printed publications identified herein are incorporated by reference in their entireties herein.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications that come within the scope of the appended claims are reserved.

I claim:

1. A modular temperature control system, comprising:
   a temperature control unit;
   a storage module, wherein the storage module includes a product storage area;
   a thermal transfer bladder disposed in the storage module, wherein the thermal transfer bladder is filled with eutectic fluid; and
   a fluid transport line having a first end and a second end, wherein the first end is coupled to the temperature control unit and the second end is coupled to the storage module by a releasable coupling,
   wherein a heated or chilled fluid provided through the fluid transport line from the temperature control unit is transported through the storage module to heat or chill, respectively, the eutectic fluid thereby warming or cooling, respectively, the product storage area relative to an environment where the storage module is disposed.

2. The modular temperature control system of claim 1, a further storage module coupled to the temperature control unit by a further fluid transport line.

3. The modular temperature control system of claim 2, wherein the storage module and the further storage module are connected to the temperature control unit in series.

4. The module temperature control system of claim 2, wherein the storage module and the further storage module are connected in parallel.

5. The modular temperature control system of claim 1, wherein the storage module comprises a heat exchanger.

6. The modular temperature control system of claim 5, wherein the storage module comprises a hydroelectric generator disposed in-line with a circulation line through which the heated or chilled fluid is transported, wherein the hydroelectric generator is driven by a flow of the heated or chilled fluid through the circulation lines to create electricity within the storage module.

7. The modular temperature control system of claim 6, wherein the hydroelectric generator powers a fan assembly, which blows and draws air through the heat exchanger.

8. The module temperature control system of claim 6, wherein the hydroelectric generator powers a light.

9. The modular temperature control system of claim 1, wherein the storage module comprises a turbine assembly disposed in line with a circulation line through which the heated or chilled fluid is transported, the turbine assembly rotating a first magnet that is adapted to magnetically couple with a second magnet not physically touching the first magnet and thereby rotate the second magnet.

10. The modular temperature control system of claim 1, further comprising a base station in the form of a cabinet having an enclosed interior that can be accessed through a door and one or more storage accessories for holding a storage module, wherein the cabinet includes releasable couplings on an exterior side thereof for connecting to at least one of the temperature control unit and another base station, and circulation lines running through the cabinet for circulating thermal transport fluid therethrough.

11. The modular temperature control system according to claim 10, wherein the circulation lines comprise terminals with releasable couplings accessible on the interior, whereby the storage module may be operatively connected to the thermal transport fluid by connection with the terminals.

12. The modular temperature control system of claim 10, wherein the base station further comprises wheels for transporting the base station.

13. The modular temperature control system of claim 10, wherein the base station further comprises a heat exchanger adapted to heat or cool the interior.

14. The modular temperature control system of claim 13, wherein the heat exchanger comprising a eutectic bladder.

15. The modular temperature control system of claim 10, wherein the base station comprises a shelf for supporting a product and a heat exchanger in the shelf for one of heating and cooling the product.

16. A movable storage module for storing a product at a selected temperature, the storage module comprising:
   an insulated outer shell;
   a heat exchanger including a thermal exchange bladder for heating or cooling an inner side of the outer shell, wherein the thermal transfer bladder is filled with an eutectic fluid;
   circulation lines for circulating heated or cooled liquid to and from the heat exchanger to heat or cool the eutectic fluid; and
   releasable couplings at terminal ends of the circulation lines on the exterior side of the outer shell,
   wherein the releasable couplings may be coupled and uncoupled to complementary couplings.

17. The movable storage module of claim 16, further comprising:
   a hydroelectric generator disposed in-line with one of the circulation lines through which heated and/or cooled fluid is pumped to heat or cool the storage module, wherein the hydroelectric generator is driven by a flow of the heated or chilled fluid through the circulation lines to create electricity within the storage module to power a light or a fan carried by the movable storage module.

18. The movable storage module of claim 16, further comprising;
a turbine assembly disposed in-line with one of the circulation lines through which heated and/or cooled fluid is pumped to heat or cool the storage module, wherein the turbine assembly rotates a first magnet that is adapted to magnetically couple with a second magnet not physically touching the first magnet and thereby rotate the second magnet, whereby the turbine assembly is operative to power a light or drive a fan carried by the movable storage module.

19. A cooling fan comprising:
a base defining a product storage area;
a heat exchanger and a fan unit carried above the base;
circulation lines for circulating heated or cooled liquid to and from the heat exchanger and the fan unit; and
releasable couplings at terminal ends of the circulation lines on the exterior side of the outer shell, the releasable couplings operative to be coupled and uncoupled to complementary couplings from the circulation lines, the fan unit having a hydroelectric generator or turbine assembly connected in-line in one of the circulation lines for operating the fan unit,
wherein circulation of heated or cooled liquid through the circulation lines cools the heat exchanger and drives the hydroelectric generator or turbine assembly to power the fan unit to circulate air in the product storage area.

* * * * *